(12) United States Patent
Kulkarni et al.

(10) Patent No.: US 11,226,653 B2
(45) Date of Patent: Jan. 18, 2022

(54) SINGLE DISPLAY LAPTOP DESIGN

(71) Applicant: Intel Corporation, Santa Clara, CA (US)

(72) Inventors: Shantanu Dattatraya Kulkarni, Hillsboro, OR (US); Tongyan Zhai, Portland, OR (US); Prosenjit Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/831,221

(22) Filed: Mar. 26, 2020

(65) Prior Publication Data

US 2020/0225703 A1    Jul. 16, 2020

(51) Int. Cl.
*G06F 1/16* (2006.01)
*G06F 3/041* (2006.01)

(52) U.S. Cl.
CPC .......... *G06F 1/1637* (2013.01); *G06F 1/1616* (2013.01); *G06F 3/041* (2013.01); *G06F 1/1681* (2013.01)

(58) Field of Classification Search
CPC .... G06F 1/1616; G06F 1/1637; G06F 1/1647; G06F 1/165; G06F 3/041; G06F 1/1681; G06F 1/1683; G06F 1/169; G06F 3/0488; G06F 2203/04804; G06F 1/1613; G06F 1/1643; G06F 1/1652; G06F 3/0412; G06F 3/04886

See application file for complete search history.

(56) References Cited

U.S. PATENT DOCUMENTS

| | | | | |
|---|---|---|---|---|
| 9,830,075 | B2* | 11/2017 | Kim | G06F 1/1641 |
| 10,437,414 | B2* | 10/2019 | Kang | G11B 27/34 |
| 10,657,926 | B2* | 5/2020 | Shin | G09G 5/14 |
| 2015/0220299 | A1* | 8/2015 | Kim | G06F 3/013 345/1.3 |
| 2016/0291642 | A1* | 10/2016 | Kwak | G06F 1/1677 |
| 2018/0188774 | A1* | 7/2018 | Ent | G06F 1/1618 |

* cited by examiner

*Primary Examiner* — Nelson M Rosario
(74) *Attorney, Agent, or Firm* — Schwegman Lundberg & Woessner, P.A.

(57) ABSTRACT

Various systems and methods for managing an ambient user interface on a laptop are described herein. A laptop device includes an upper portion including a display device and a lower portion coupled to the upper portion with a hinge mechanism, the lower portion including a reflective surface. When the laptop device is closed and the upper portion abuts the lower portion, the display device is configured to display images that are reflected on the reflective surface.

25 Claims, 6 Drawing Sheets

SINGLE DISPLAY LAPTOP DESIGN

TECHNICAL FIELD

Embodiments described herein generally relate to laptop systems, and in particular, to a system that provides an ambient display with a single display.

BACKGROUND

Ambient computing for client systems refers to computing that is all around the user or ever present. Sensors and computing systems are becoming increasingly integrated into everyday life. Computer assistants exist in many places including the home, the car, and on mobile devices. Ambient interfaces provide an immersive user experience. Users may interact with ambient computers with convenient displays, voice-based systems, and user gesture actions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a system that provides an ambient user interface (UI) with a single laptop display. In contrast to some designs that use a separate display for an ambient UI, the present implementation uses a reflective surface to reflect displayed contents from the primary display. The reflective surface may be touch sensitive and configured to receive user input. By using a single display instead of multiple displays, the present system reduces the weight, thickness, cost, complexity, power consumption, and overhead of previous designs.

Figure 1:
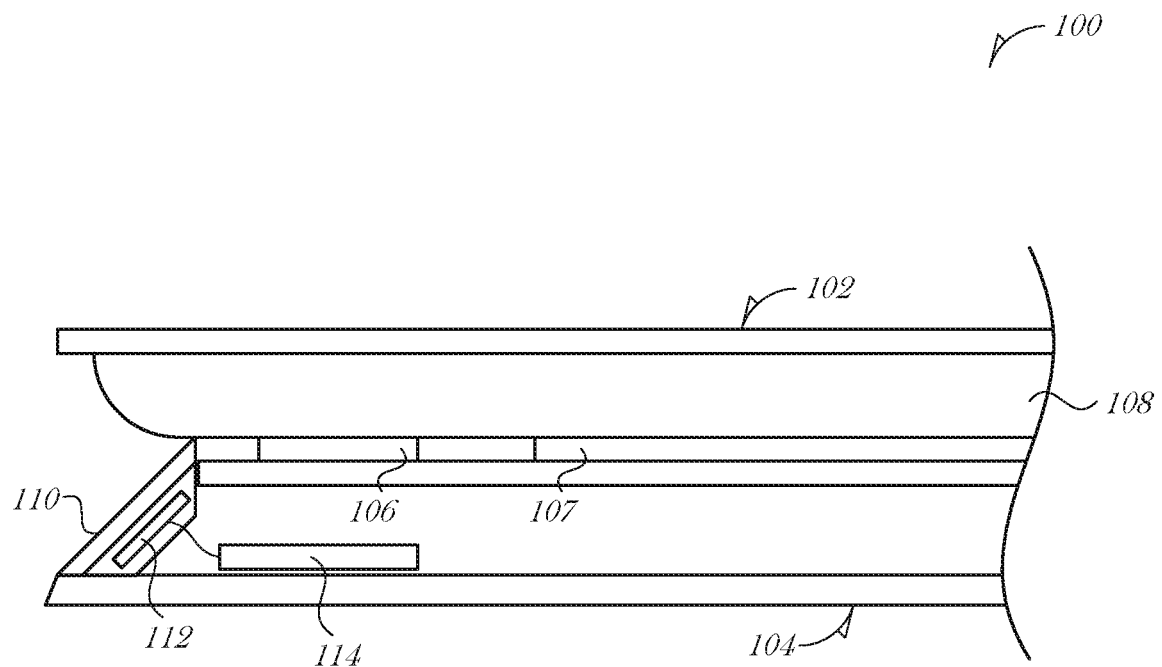
FIG. 1 is a diagram illustrating a cross-sectional view of a laptop computer, according to an embodiment.

FIG. 1 is a diagram illustrating a cross-sectional view of a laptop computer 100, according to an embodiment. The laptop computer 100 includes an upper portion 102 and a base portion 104. The upper portion 102 may also be referred to as the lid, cover, or top of the laptop computer 100. The upper portion 102 and base portion 104 are connected using one or more hinges (not shown). The hinges may be configured to allow the upper portion 102 to open to substantially 180° so that the upper portion 102 is in substantially the same plane as the base portion 104. Other hinge configurations may allow the upper portion 102 to be folded open to substantially 360° to rest upon on the base portion 104, such as to provide a tablet computer configuration. In some implementations, when in a folded over configuration, keyboards and other input devices on the base portion 104 may be disabled.

The upper portion 102 includes a display 108. While not shown, the upper portion 102 may also include electronics, antennas, and other circuitry to provide wireless communications (e.g., Wi-Fi, Bluetooth, LTE, etc.). The display 108 may be a light-emitting diode (LED) display, liquid crystal display (LCD), organic LED (OLED), or the like. The display 108 may be touch sensitive to allow for touch inputs on the display 108.

The base portion 104 may include a touch pad 106, keyboard 107, or other user input devices. The base portion 104 may include a battery, storage device, motherboard, and other circuitry to provide the bulk of the functionality of the laptop computer 100. In another example, the battery, storage device, motherboard, and other computer functionality circuitry may be included in the upper portion 102, such as to provide a tablet computer that can be separated from the base portion 104.

The display 108 is configured to extend to the edge of the upper portion 102, providing a nearly bezel-less design. Additionally, the display 108 may be curved on the front edge that is opposite of the hinges. The curvature of the display 108 allows static or dynamic images (e.g., icons) to be produced and observed while the laptop computer 100 is open or closed. When in a closed position, the images displayed on the display 108 are reflected by reflective surface 110. The reflective surface 110 may have a cross section that is substantially planar, convex, or concave. Different cross section profiles may provide different reflective properties, allowing the images that are reflected to be produced with more accuracy. When closed, the laptop computer 100 will typically be in a horizontal orientation as shown in FIG. 1, allowing a user to view images displayed on the display 108 as reflected on the reflective surface 110. The laptop may also be closed in a vertical orientation, such as closed and stowed in a laptop bag, and a user may view images directly on the display 108.

A touch sensitive layer 112 may optionally be placed behind the reflective surface 110 to provide a touch-based input for the user of the laptop computer 100. A touch controller 114 is used to capture locations of touch and swipe events on the reflective surface 110, and provide the coordinates to other portions of the laptop computer 100 to process touch input. The touch or swipe events may include selecting an icon, swiping away an icon, adjusting a volume or other slider input, swiping to lock or unlock the laptop computer 100, or other touch or swipe event. A feedback device may optionally be placed behind the reflective surface 110 or elsewhere within the laptop computer 100, such as to provide tactile or audible feedback in response to a touch or swipe event.

Figure 2:
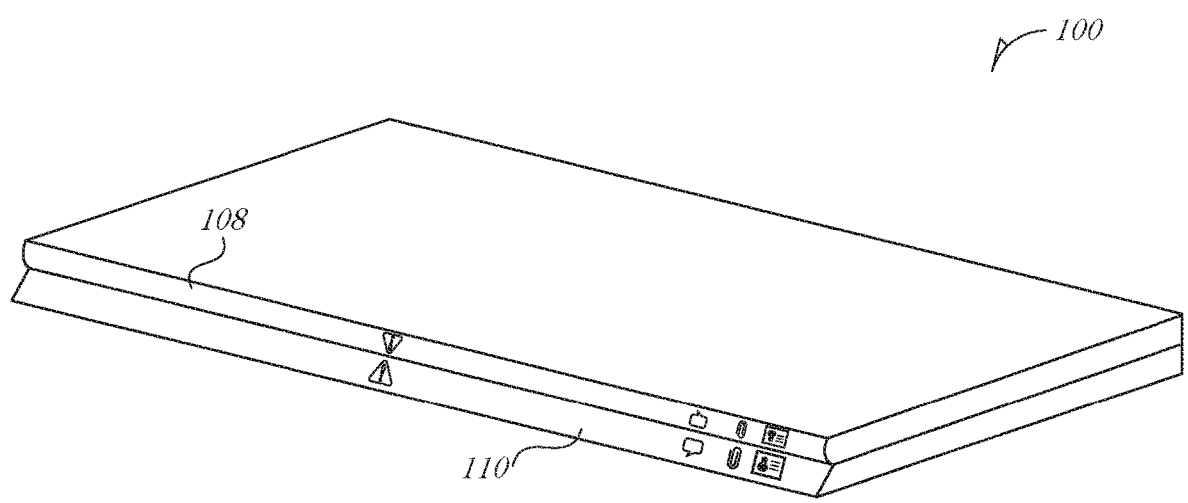
FIG. 2 is another view of the laptop computer, according to an embodiment.

FIG. 2 is another view of the laptop computer 100, according to an embodiment. Various static or dynamic images displayed on the display 108 are reflected in the reflective surface 110. The reflective surface 110 may be a highly-reflective fabric, an acrylic mirror, a glass mirror, highly-reflective plastic, or the like. A user may interact with one or more reflected images, such as by touching or swiping the reflective surface 110 at the location of a reflected image.

Figure 3:
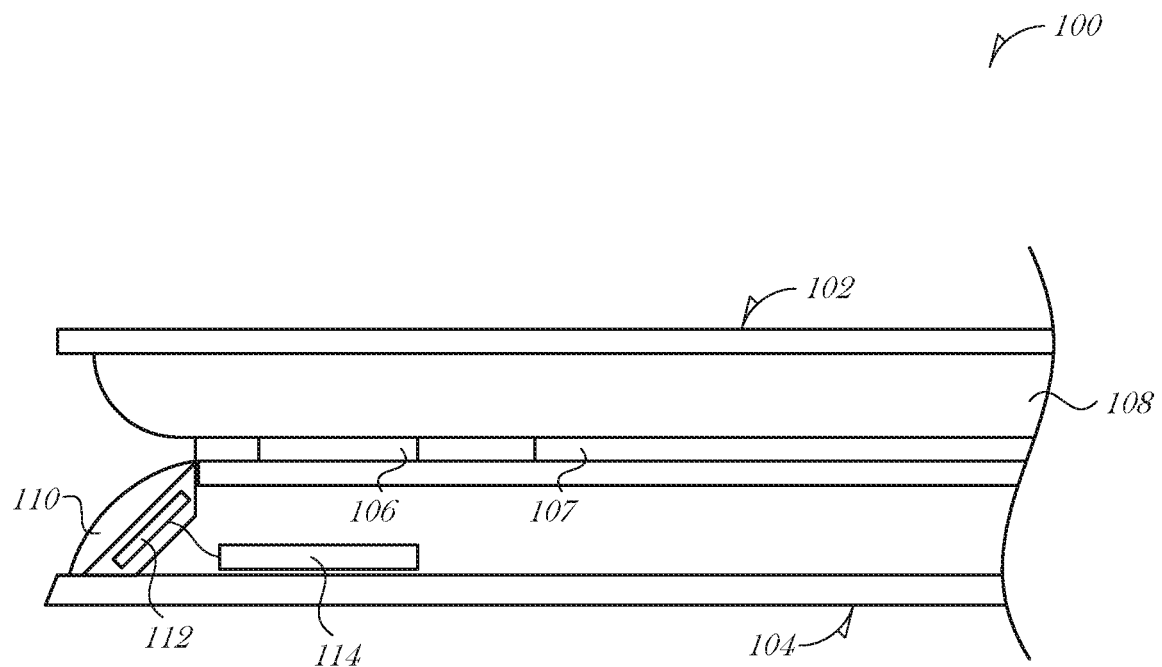
FIG. 3 is an alternative configuration of the laptop computer illustrating a curved reflective surface, according to an embodiment.

FIG. 3 is an alternative configuration of the laptop computer 100 illustrating a curved reflective surface 110, according to an embodiment. The curved reflective surface 110 may be convex as shown in FIG. 3, or may be concave. The curvature and other features of the surface geometry of the curved reflective surface 110 may be selected to improve the performance of a given display 108. The surface geometry of the curved reflective surface 110 may be selected to provide an optimal reproduction of the images displayed on the display 108. The surface geometry of the curved reflective surface 110 may be selected to provide an improved touch-sensitive interface, such as providing a rounded touch surface and bringing the touch surface closer to the user. Additionally, a curved surface also provides some magnification for content, which enhances visuals and use as a touch surface. The curved reflective surface 110 may have a protective coating to provide scratch resistance and robustness. The protective coating may be sufficiently thin to reduce or minimize the effects on refractive index of images reflected on the reflective surface 110.

Figure 4:
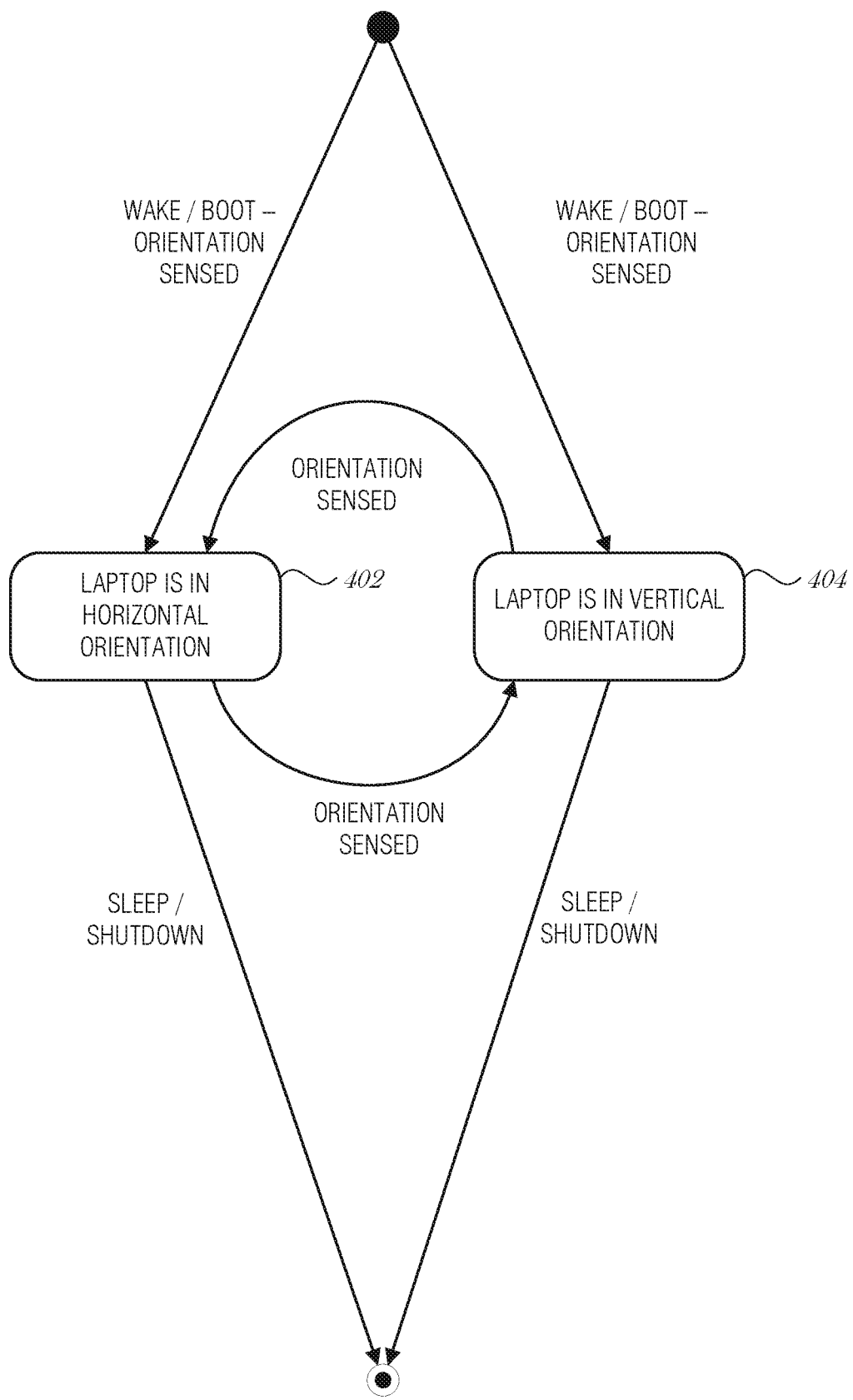
FIG. 4 is a state diagram illustrating operational states, according to an embodiment.

FIG. 4 is a state diagram 400 illustrating operational states, according to an embodiment. In state 402, the laptop computer 100 is closed and in a horizontal orientation, where the upper portion 102 is lying on the base portion 104, such as shown in FIG. 2. In this configuration, the images displayed on the curved portion of the display 108 may be adjusted so that the image reflected on the base portion 104 is proportional and accurate. For instance, the images may be skewed, elongated, shortened, stretched, flipped, rotated, or otherwise manipulated so that the image reflected on the base portion 104 is relatively accurate. As an example, a square icon may be shortened to look like a rectangle so that when reflected, the icon appears to be square shaped again. The user is viewing the icons reflected on the base portion 104 and not viewing the display 108 directly, so the image manipulation shown on the display 108 is not a distraction to the user.

In state 404, the laptop computer 100 is oriented upright such that it is resting on the edge with the hinges 106. In this orientation, the images on the curved portion of the display 108 are not manipulated and are presented so the user can view them directly. A laptop computer 100 may be in state 404 when closed and oriented upright, such as when stowed in a laptop bag. If there is a touch sensitive layer 112 coupled to the reflective surface 110, then it may be disabled when the laptop computer 110 is closed and in the upright orientation to reduce or prevent false positive interactions. A secondary touch sensitive layer may be coupled to the curved portion of the display 108, which may be activated when the laptop computer 110 is closed and in the upright orientation, or may be disabled to reduce or prevent false positive interactions.

Transitioning between state 402 and state 404 may be implemented using a gyroscope, accelerometer, magnetometer, hinge sensor, or other sensors to determine the orientation and closed state of the laptop computer 100. Sensor values may be collected and analyzed at an orientation sensing unit, which may be a component, module, or other element on a system-on-a-chip (SoC), processor package, or the like.

The laptop computer 100 may be in state 404 when open, such as when a user is interacting with the laptop computer 100. In this open position, the images on the curved portion of the display 108 may also be presented so the user can view them directly. The images on the curved portion of the display 108 may be adjusted based on various sensor inputs, such as a screen angle orientation sensor (e.g., accelerometer), a detected open angle between the upper portion 102 and base portion 104 (e.g., hinge angle detection), a detected eye level of a user (e.g., laptop camera facial detection), or other sensor inputs. In the open position, the touch sensitive layer 112 corresponding to the reflective surface 110 may be disabled at all times, disabled when a user is interacting with a touchpad 106 or keyboard 107, enabled for predetermined actions (e.g., only enabled with volume slider or swipe to lock), or otherwise selectively or completely enabled or disabled. A secondary touch sensitive layer may be coupled to the curved portion of the display 108, may be activated when the laptop computer 110 is open and in an upright orientation.

The laptop computer 100 may also be used in a tablet configuration, such as by folding the upper portion 102 to substantially 360° to rest upon on the base portion 104, or by separating the upper portion 102 from the base portion 104. In this tablet configuration, images on the curved portion of the display 108 may also be presented so the user can view them directly. When the laptop computer 100 is in a tablet configuration, the images on the curved portion of the display 108 may displayed directly or adjusted based on various sensor inputs, such as a screen angle orientation sensor (e.g., tablet viewing angle), a detected eye level of a user, a screen reversal sensor (e.g., whether the curved portion of the display 108 is positioned along a top or bottom edge of the tablet), or other sensor inputs. When the laptop computer 100 is in a tablet configuration but not being used (e.g., the laptop computer 100 is on a table with display 108 facing upward), the images on the curved portion of the display 108 may displayed directly, rotated 180°, or otherwise adjusted based on various sensor inputs. When the laptop computer 100 is in a tablet configuration but not being used, the main portion of the display 108 may be turned off while the images on the curved portion of the display 108 are displayed. A secondary touch sensitive layer may be coupled to the curved portion of the display 108, which may be activated when the laptop computer 100 is in a tablet configuration but not being used.

Figure 5:
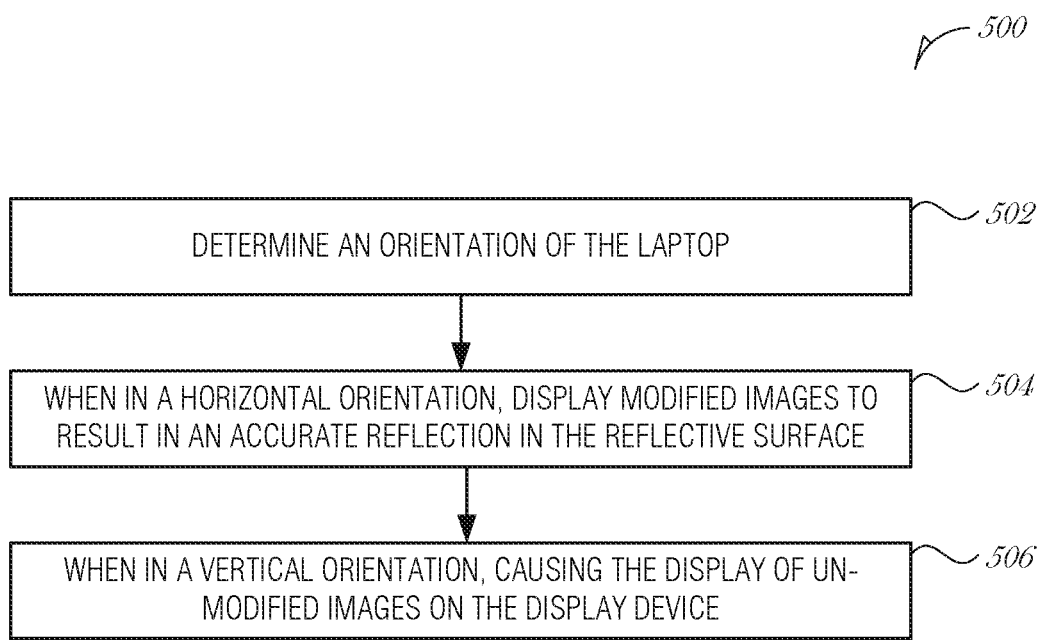
FIG. 5 is a flowchart illustrating a method of managing an ambient user interface, according to an embodiment.

FIG. 5 is a flowchart illustrating a method 500 of managing an ambient user interface, according to an embodiment. The ambient user interface is incorporated in a laptop having an upper portion and a base portion, the upper portion including a display device, and the base portion including a reflective surface.

At 502, an orientation of the laptop is determined, the orientation being one of a horizontal orientation or a vertical orientation.

At 504, when in a horizontal orientation, the method 500 includes causing the display of images on the display device where the images are modified to result in an accurate reflection in the reflective surface. In an embodiment, the display device is configured to modify the images to result in an accurate reflection in the reflective surface. In a further embodiment, the display device is configured to modify the images by skewing the images. In a related embodiment, the display device is configured to modify the images by stretching the images. In a related embodiment, the display device is configured to modify the images by rotating the images. In a related embodiment, the display device is configured to modify the images by flipping the images.

At 506, when in a vertical orientation, the method 500 includes causing the display of un-modified images on the display device.

In an embodiment, the method 500 includes receiving and processing touch inputs caused by a user touching a touch-sensitive layer disposed behind the reflective surface. In a further embodiment, the touch-sensitive layer is enabled when the laptop is in a horizontal orientation and the upper portion and the base portion of the laptop are in a closed position. In a related embodiment, the method 500 includes disabling the touch-sensitive layer when the laptop is in a substantially vertical position.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner. In an example, circuits may be arranged (e.g., internally or with respect to external entities such as other circuits) in a specified manner as an IP block, IP core, system-on-chip (SOC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SOC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

Figure 6:
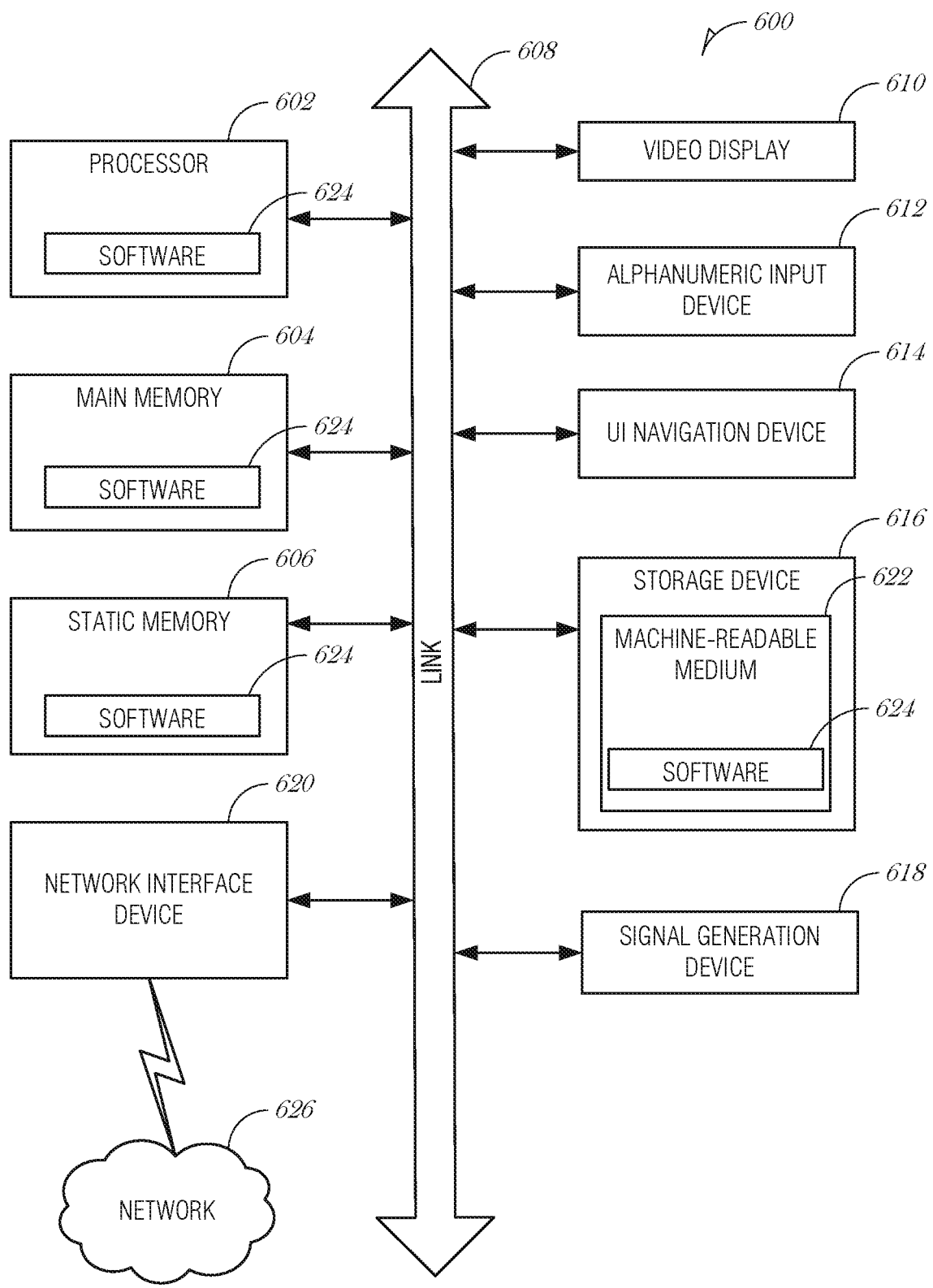
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any, machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 6:20, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 6:26 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a laptop device comprising: an upper portion including a display device, the display device wrapping around an edge of the upper portion; and a lower portion coupled to the upper portion with a hinge mechanism, the lower portion including a reflective surface along an edge of the lower portion, wherein when the laptop device is closed and the edge of the upper portion abuts the edge of the lower portion, the display device is configured to display images that are reflected on the reflective surface.

In Example 2, the subject matter of Example 1 includes, wherein the reflective surface comprises a mirror.

In Example 3, the subject matter of Example 2 includes, wherein the mirror is a glass mirror.

In Example 4, the subject matter of Examples 2-3 includes, wherein the mirror is an acrylic mirror.

In Example 5, the subject matter of Examples 1-4 includes, wherein the reflective surface comprises a reflective fabric.

In Example 6, the subject matter of Examples 1-5 includes, wherein the reflective surface comprises a reflective plastic.

In Example 7, the subject matter of Examples 1-6 includes, wherein the reflective surface includes a substantially flat surface.

In Example 8, the subject matter of Examples 1-7 includes, wherein the reflective surface includes a substantially curved surface.

In Example 9, the subject matter of Example 8 includes, wherein the reflective surface has a convex profile.

In Example 10, the subject matter of Examples 1-9 includes, wherein the reflective surface is covered with a protective coating.

In Example 11, the subject matter of Examples 1-10 includes, wherein the display device is configured to modify the images to result in an accurate reflection in the reflective surface.

In Example 12, the subject matter of Example 11 includes, wherein the display device is configured to modify the images by skewing the images.

In Example 13, the subject matter of Examples 11-12 includes, wherein the display device is configured to modify the images by stretching the images.

In Example 14, the subject matter of Examples 11-13 includes, wherein the display device is configured to modify the images by rotating the images.

In Example 15, the subject matter of Examples 11-14 includes, wherein the display device is configured to modify the images by flipping the images.

In Example 16, the subject matter of Examples 1-15 includes, wherein the laptop device comprises an orientation sensing unit, and wherein the display device is configured to modify the images based on the orientation sensing unit.

In Example 17, the subject matter of Example 16 includes, wherein the display device is configured to modify the images to result in an accurate reflection in the reflective surface when the orientation sensing unit indicates that the laptop device is closed and in a substantially horizontal orientation.

In Example 18, the subject matter of Example 17 includes, wherein the display device is configured to not modify the images when the orientation sensing unit indicates that the laptop device is closed and in a substantially vertical orientation.

In Example 19, the subject matter of Examples 17-18 includes, wherein the display device is configured to not modify the images when the orientation sensing unit indicates that the upper portion in a substantially vertical orientation.

In Example 20, the subject matter of Examples 16-19 includes, a touch-sensitive layer disposed behind the reflective surface to provide a touch input mechanism, wherein the touch-sensitive layer is enabled when the orientation sensing unit indicates that the laptop device is closed in a substantially horizontal orientation.

In Example 21, the subject matter of Example 20 includes, wherein the touch-sensitive layer is disabled when the orientation sensing unit indicates that the upper portion is in a substantially vertical orientation.

Example 22 is a method of managing an ambient user interface on a laptop having an upper portion and a base portion, the upper portion including a display device, and the base portion including a reflective surface, the method comprising: determining an orientation of the laptop, the orientation being one of a horizontal orientation or a vertical orientation; when in a horizontal orientation, causing the display of images on the display device where the images are modified to result in an accurate reflection in the reflective surface; and when in a vertical orientation, causing the display of un-modified images on the display device.

In Example 23, the subject matter of Example 22 includes, wherein the display device is configured to modify the images to result in an accurate reflection in the reflective surface.

In Example 24, the subject matter of Example 23 includes, wherein the display device is configured to modify the images by skewing the images.

In Example 25, the subject matter of Examples 23-24 includes, wherein the display device is configured to modify the images by stretching the images.

In Example 26, the subject matter of Examples 23-25 includes, wherein the display device is configured to modify the images by rotating the images.

In Example 27, the subject matter of Examples 23-26 includes, wherein the display device is configured to modify the images by flipping the images.

In Example 28, the subject matter of Examples 22-27 includes, receiving and processing touch inputs caused by a user touching a touch-sensitive layer disposed behind the reflective surface.

In Example 29, the subject matter of Example 28 includes, wherein the touch-sensitive layer is enabled when the laptop is in a horizontal orientation and the upper portion and the base portion of the laptop are in a closed position.

In Example 30, the subject matter of Examples 28-29 includes, disabling the touch-sensitive layer when the laptop is in a substantially vertical position.

Example 31 is at least one machine-readable medium including instructions, which when executed by a machine, cause the machine to perform operations of any of the methods of Examples 22-30.

Example 32 is an apparatus comprising means for performing any of the methods of Examples 22-30, Example 33 is an apparatus for managing an ambient user interface on a laptop having an upper portion and a base portion, the upper portion including a display device, and the base portion including a reflective surface, comprising: means for determining an orientation of the laptop, the orientation being one of a horizontal orientation or a vertical orientation; means for causing the display of images on the display device where the images are modified to result in an accurate reflection in the reflective surface when in a horizontal orientation; and means for causing the display of un-modified images on the display device when in a vertical orientation.

In Example 34, the subject matter of Example 33 includes, wherein the display device is configured to modify the images to result in an accurate reflection in the reflective surface.

In Example 35, the subject matter of Example 34 includes, wherein the display device is configured to modify the images by skewing the images.

In Example 36, the subject matter of Examples 34-35 includes, wherein the display device is configured to modify the images by stretching the images.

In Example 37, the subject matter of Examples 34-36 includes, wherein the display device is configured to modify the images by rotating the images.

In Example 38, the subject matter of Examples 34-37 includes, wherein the display device is configured to modify the images by flipping the images.

In Example 39, the subject matter of Examples 33-38 includes, means for receiving and processing touch inputs caused by a user touching a touch-sensitive layer disposed behind the reflective surface.

In Example 40, the subject matter of Example 39 includes, wherein the touch-sensitive layer is enabled when the laptop is in a horizontal orientation and the upper portion and the base portion of the laptop are in a closed position.

In Example 41, the subject matter of Examples 39-40 includes, means for disabling the touch-sensitive layer when the laptop is in a substantially vertical position.

Example 42 is at least one machine-readable medium including instructions for managing an ambient user interface on a laptop having an upper portion and a base portion, the upper portion including a display device, and the base portion including a reflective surface, the instructions, which when executed by the laptop cause the laptop to perform operations comprising: determining an orientation of the laptop, the orientation being one of a horizontal orientation or a vertical orientation; when in a horizontal orientation, causing the display of images on the display device where the images are modified to result in an accurate reflection in the reflective surface; and when in a vertical orientation, causing the display of un-modified images on the display device.

In Example 43, the subject matter of Example 42 includes, wherein the display device is configured to modify the images to result in an accurate reflection in the reflective surface.

In Example 44, the subject matter of Example 43 includes, wherein the display device is configured to modify the images by skewing the images.

In Example 45, the subject matter of Examples 43-44 includes, wherein the display device is configured to modify the images by stretching the images.

In Example 46, the subject matter of Examples 43-45 includes, wherein the display device is configured to modify the images by rotating the images.

In Example 47, the subject matter of Examples 43-46 includes, wherein the display device is configured to modify the images by flipping the images.

In Example 48, the subject matter of Examples 42-47 includes, receiving and processing touch inputs caused by a user touching a touch-sensitive layer disposed behind the reflective surface.

In Example 49, the subject matter of Example 48 includes, wherein the touch-sensitive layer is enabled when the laptop is in a horizontal orientation and the upper portion and the base portion of the laptop are in a closed position.

In Example 50, the subject matter of Examples 48-49 includes, disabling the touch-sensitive layer when the laptop is in a substantially vertical position.

Example 51 is at least one machine-readable medium including instructions that, when executed by processing circuitry, cause the processing circuitry to perform operations to implement of any of Examples 1-50.

Example 52 is an apparatus comprising means to implement of any of Examples 1-50.

Example 53 is a system to implement of any of Examples 1-50,

Example 54 is a method to implement of any of Examples 1-50.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A laptop device comprising:
    an upper portion including a display device, the display device wrapping around an edge of the upper portion, the display device being the only display device of the laptop device; and
    a lower portion coupled to the upper portion with a hinge mechanism, the lower portion including a reflective surface along an edge of the lower portion,
    wherein when the laptop device is closed and the edge of the upper portion abuts the edge of the lower portion, the display device is configured to display images on the edge of the upper portion that are reflected on the reflective surface of the lower portion such that a person is able to view the images produced by the display device of the upper portion on the reflective surface of the lower portion while the laptop device is closed.

2. The laptop device of claim 1, wherein the reflective surface comprises a mirror.

3. The laptop device of claim 2, wherein the mirror is a glass mirror.

4. The laptop device of claim 2, wherein the mirror is an acrylic mirror.

5. The laptop device of claim 1, wherein the reflective surface comprises a reflective fabric.

6. The laptop device of claim 1, wherein the reflective surface comprises a reflective plastic.

7. The laptop device of claim 1, wherein the reflective surface includes a substantially flat surface.

8. The laptop device of claim 1, wherein the reflective surface includes a substantially curved surface.

9. The laptop device of claim 8, wherein the reflective surface has a convex profile.

10. The laptop device of claim 1, wherein the reflective surface is covered with a protective coating.

11. The laptop device of claim 1, wherein the display device is configured to modify the images to result in an accurate reflection in the reflective surface.

12. The laptop device of claim 11, wherein the display device is configured to modify the images by skewing the images.

13. The laptop device of claim 11, wherein the display device is configured to modify the images by stretching the images.

14. The laptop device of claim 11, wherein the display device is configured to modify the images by rotating the images.

15. The laptop device of claim 11, wherein the display device is configured to modify the images by flipping the images.

16. The laptop device of claim 1, wherein the laptop device comprises an orientation sensing unit, and wherein the display device is configured to modify the images based on the orientation sensing unit.

17. The laptop device of claim 16, wherein the display device is configured to modify the images to result in an accurate reflection in the reflective surface when the orientation sensing unit indicates that the laptop device is closed and in a substantially horizontal orientation.

18. The laptop device of claim 17, wherein the display device is configured to not modify the images when the orientation sensing unit indicates that the laptop device is closed and in a substantially vertical orientation.

19. The laptop device of claim 17, wherein the display device is configured to not modify the images when the orientation sensing unit indicates that the upper portion in a substantially vertical orientation.

20. The laptop device of claim 16, comprising a touch-sensitive layer disposed behind the reflective surface to provide a touch input mechanism, wherein the touch-sensitive layer is enabled when the orientation sensing unit indicates that the laptop device is closed in a substantially horizontal orientation.

21. The laptop device of claim 20, wherein the touch-sensitive layer is disabled when the orientation sensing unit indicates that the upper portion is in a substantially vertical orientation.

22. A method of managing an ambient user interface on a laptop having an upper portion and a base portion, the upper portion including a display device that wraps around an edge of the upper portion, the display device being the only display device of the laptop, and the base portion including a reflective surface oriented opposite of the edge of the upper portion, the method comprising:
    determining an orientation of the laptop while the laptop is closed, the orientation being one of a horizontal orientation or a vertical orientation;
    when in a horizontal orientation, causing the display of images on the display device where the images are modified to result in an accurate reflection in the reflective surface such that a person is able to view an accurate representation of the images produced by the display device of the upper portion on the reflective surface of the base portion while the laptop is closed; and
    when in a vertical orientation, causing the display of un-modified images on the display device such that a person is able to directly view the images produced by the display device of the upper portion while the laptop is closed.

23. The method of claim 22, wherein the display device is configured to modify the images to result in an accurate reflection in the reflective surface.

24. At least one non-transitory machine-readable medium including instructions for managing an ambient user interface on a laptop having an upper portion and a base portion, the upper portion including a display device that wraps around an edge of the upper portion, the display device being the only display device of the laptop, and the base portion including a reflective surface oriented opposite of the edge of the upper portion, the instructions, which when executed by the laptop cause the laptop to perform operations comprising:

determining an orientation of the laptop while the laptop is closed, the orientation being one of a horizontal orientation or a vertical orientation;

when in a horizontal orientation, causing the display of images on the display device where the images are modified to result in an accurate reflection in the reflective surface such that a person is able to view an accurate representation of the images produced by the display device of the upper portion on the reflective surface of the base portion while the laptop is closed; and when in a vertical orientation, causing the display of un-modified images on the display device such that a person is able to directly view the images produced by the display device of the upper portion while the laptop is closed.

25. The at least one non-transitory machine-readable medium of claim 24, comprising receiving and processing touch inputs caused by a user touching a touch-sensitive layer disposed behind the reflective surface.

\* \* \* \* \*